G. JAMES, S. BENSON & W. WILSON.
DETACHABLE PIPE AND HOSE COUPLING.
APPLICATION FILED OCT. 10, 1907.
918,858. Patented Apr. 20, 1909.
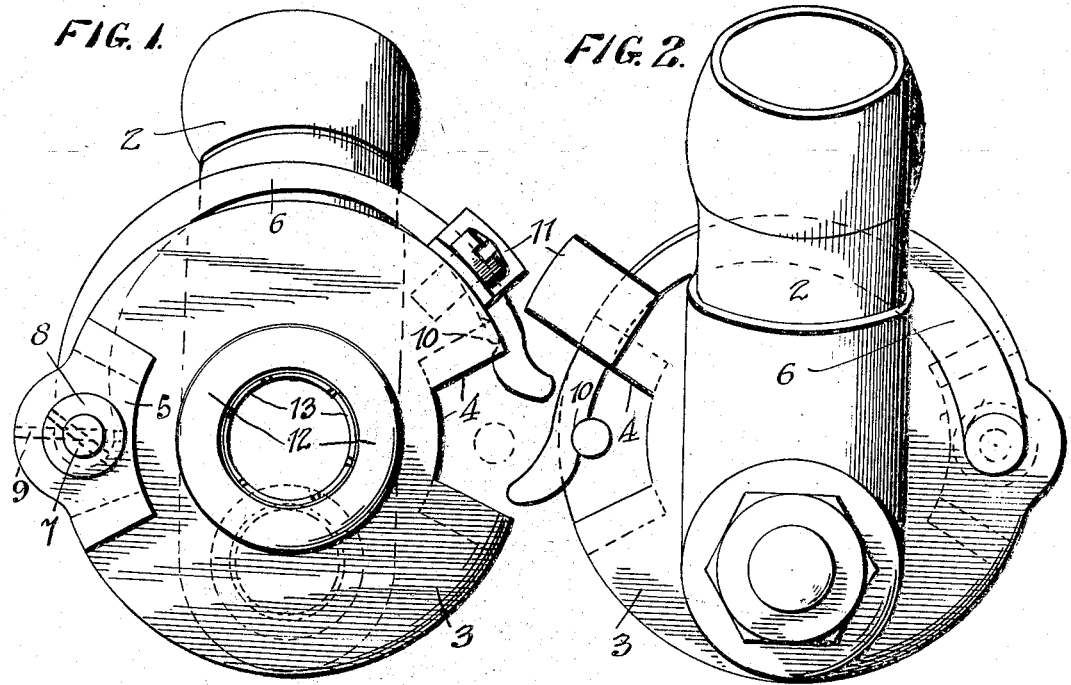
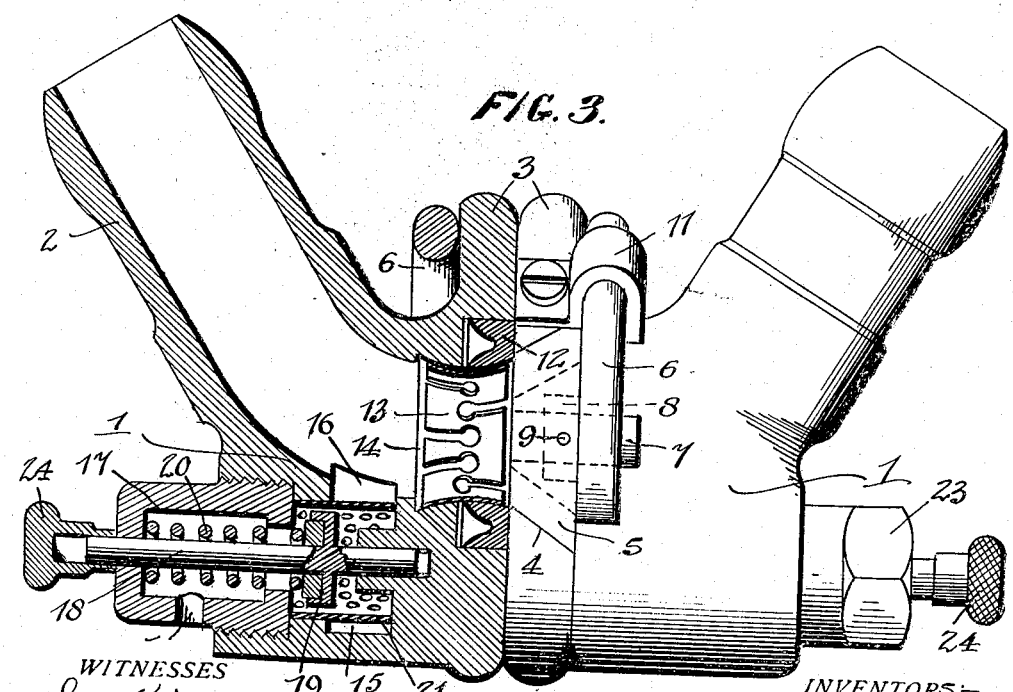

UNITED STATES PATENT OFFICE.

GEORGE JAMES, SAMUEL BENSON, AND WILLIAM WILSON, OF CHICAGO, ILLINOIS.

DETACHABLE PIPE AND HOSE COUPLING.

No. 918,858.     Specification of Letters Patent.     Patented April 20, 1909.

Application filed October 10, 1907. Serial No. 396,833.

*To all whom it may concern:*

Be it known that we, GEORGE JAMES, SAMUEL BENSON, and WILLIAM WILSON, citizens of the United States, residing at Chicago, in the county of Cook and State of Illinois, have invented certain new and useful Improvements in Detachable Pipe and Hose Couplings, of which the following is a specification.

Our invention relates to pipe and hose couplings, and the objects thereof are to provide a coupling in which the coupling members are of identical construction, each of said members being provided with means for locking the same with another coupling adapted to be secured or released without the use of wrenches or special tools, and in which devices are combined therewith for automatically draining the matter remaining in the pipe or hose and which is liable otherwise to freeze during intervals of non-service.

Our invention further and specifically resides in the following features of construction, arrangement and operation, as will be hereinafter described with reference to the accompanying drawings forming a part of this specification, in which like numerals are used to designate like parts throughout the figures, and in which Figure 1 is an inner face view of one of the coupling members, Fig. 2 is an outer face view thereof and Fig. 3 is a view partly in elevation and partly in section of a pair of members in a coupled position.

In the practical embodiment of our invention, we provide a pair of coupling members, each of which are identical in structure, and each of which comprises a body portion 1 having an upwardly extending tubular portion 2 adapted for the reception of a hose or the like thereon. The body portion 1 is further provided on one end with a circular flange 3 extending around the bore of said tubular portion 2 and provided with a dove-tail slot 4 cut therein and with an extending dovetail projection 5 opposite said slot. The coupling members being each of identical construction, their respective slots 4 and projections 5 will engage, locking the flanges 3 against one another, and uniting the two coupling members with the bores of the tubular portions 2 in alinement. Each of the coupling members is provided with a heavy spring latch 6 having an angular end 7 arranged through an opening centrally of its projection 5, said latch 6 being curved to lie behind the flange 3 and being adapted to swing upon its angular end 7. At the end of the angular portion 7 of the latch 6 is secured a collar 8 by means of a transverse pin, said collar being seated within an enlarged bore in the projection 5 and being adapted to rotate with said angular portion 7 to prevent the withdrawal of the same, and said pin used to lock said collar being inserted by means of an opening 9 extending transversely of the projection 5.

The extreme end of the angular portion 7 extends substantially beyond its respective projection 5 and collar 8 and is adapted to receive thereon the free end of the latch 6 of the opposing coupling member, said latch 6 being adapted to be moved on its pivot to a position shown in Fig. 1 to allow the projection 5 to engage within the slot 4 opposite the same, and being then adapted to be moved forwardly upon its pivot to a position shown in Fig. 2, said spring latch being so formed as to necessitate the same being sprung on a line with its pivot in order to associate its depression 10 about the projecting ends of the angular portion 7. The coupling members will thus be snugly and securely locked while being adapted to be readily unlocked. To provide against accidental displacement of the latches 6, which displacement would allow the coupled members to fall apart, we provide the flanges 3 with guide brackets 11 in which said latches are slidably arranged adjacent their free ends. Each of the coupling members is further provided at the end of the bore of the tubular portion 2, and adjacent the flange 3 with an enlarged circular groove adapted to receive therein a gasket 12 of suitable construction and held therein by means of a sheet metal retaining ring 13 provided with oppositely extending slotted portions extending transversely thereof from a central point and in staggered relation in order to allow the edges of said ring to be flared outwardly into engagement respectively, with the gasket 12 and a circular recess 14 extending around the bore of the tubular portion 2 adjacent said gasket. The rings 13 thus form means for holding the gaskets 12 in place when the members are uncoupled.

Each of the coupling members is provided with a bore 15 extending at right angles to the flanges 3 in the casing thereof below the bore of the tubular portion 2, and communicating with said bore of said tubular portion by an opening 16. The bore 15 is provided adjacent its mouth with a threaded enlargement adapted for the reception therein of a hollow casing 17 opening inwardly and provided with a valve stem 18 mounted therethrough and extending within a recess formed in the material of the coupling member at the inner end of the bore 15. The valve stem 18 is slidable within said recess and through said casing 17 and is provided with a valve 19 thereon adapted to be seated against the inner opening of the casing 17 by the pressure within the couplings when in use. When the coupling is not being used however, the spring 20 mounted about the stem 18 within the casing 17 moves said valve away from said opening, allowing any material remaining within the bore of the tubular portion 2, to drain downwardly through the opening 16, through a perforated tubular member 21 arranged within the bore 15, past the valve 19 into the casing 17 from whence it escapes by means of a discharge opening 22 leading downwardly through the material of said casing. The casing 17 and the draining mechanism just described may be readily removed by screwing said casing outwardly and withdrawing the operating parts, said casing 17 being constructed to form a nut 23 on its outer end adapted for the reception of a wrench or like implement. The outer end of the valve stem 18 projects through the material of the casing 17 and is preferably provided on its outer end with a knob 24 by which means said stem may be thrust inwardly to open the valve 19 in case it becomes necessary to relieve the pressure in the bores of the coupling members.

Having thus fully described our invention, we claim:

1. The combination in a coupling of the character described, of coupling members of identical construction, each comprising a body portion, an upwardly curved tubular portion extending from one end of said body portion, and an outstanding circular flange at the other end of said body portion, to abut the flange of the opposing member, said flanges being provided with oppositely disposed wedge-shaped slots and wedge-shaped projections adapted to be engaged by relatively opposite sidewise movements of said members, said slots being formed through the entire width of said flanges, said projections being provided with forwardly extending portions beyond said slots, locking members pivotally mounted upon said flanges, and spanning said slots to engage over said projecting portions, and pressure closed drain valves mounted in the base of said body portions, and in alinement when the members are locked, and having communication with the lower ends of said tubular portions to drain the same when the pressure is released, substantially as described.

2. The combination in a coupling of the character described, of coupling members of identical construction, each comprising a body portion, an upwardly curved tubular portion extending from one end of said body portion, and an outstanding circular flange at the other end of said body portion, to abut the flange of the opposing member, said flanges being provided with oppositely disposed wedge-shaped slots and wedge-shaped projections adapted to be engaged by relatively opposite sidewise movements of said members, said slots being formed through the entire width of said flanges, said projections being provided with forwardly extending portions beyond said slots, locking members pivotally mounted upon said flanges, and spanning said slots to engage over said projecting portions, pressure closed drain valves mounted within the bases of said body portions, and in alinement when the members are locked, and having communication with the lower ends of said tubular portion, and means to open said valves to drain the said tubular portions, when the pressure is released, substantially as described.

In testimony whereof we affix our signatures in presence of two witnesses.

GEORGE JAMES.
SAMUEL BENSON.
WILLIAM WILSON.

Witnesses:
BARNEY J. STUART,
FRANK C. SHAFER.